United States Patent [19]
Cade

[11] 3,727,073
[45] Apr. 10, 1973

[54] FLAME SENSOR CONTROL CIRCUIT
[75] Inventor: Philip J. Cade, Winchester, Mass.
[73] Assignee: Electronics Corporation of America, Cambridge, Mass.
[22] Filed: Aug. 2, 1971
[21] Appl. No.: 168,074

Related U.S. Application Data
[62] Division of Ser. No. 15,014, Feb. 20, 1970, Pat. No. 3,644,074.

[52] U.S. Cl.................307/117, 317/132, 340/227 R
[51] Int. Cl............................................H01h 37/00
[58] Field of Search.....................317/132; 307/116, 307/117, 141; 340/227

[56] References Cited
UNITED STATES PATENTS

| | | | |
|---|---|---|---|
| 2,807,758 | 9/1957 | Pinckaers | 317/132 X |
| 3,249,146 | 5/1966 | Remick et al. | 317/132 X |

Primary Examiner—Robert K. Schaefer
Assistant Examiner—William J. Smith
Attorney—Willis M. Ertman

[57] ABSTRACT

Control apparatus featuring a condition sensor, a first relay responsive to a signal from the condition sensor, the first relay being in a first state in the absence of a signal from the condition sensor and being switched to a second state in response to a signal from the condition sensor, a control relay adapted to be switched between first and second states, circuitry responsive to an operation request for switching the control relay from the first state to the second state after a time interval, and clamping circuitry operative in response to the detection of the first relay in its second state during the time interval to clamp the first relay in the second state and the control relay in the first state, overriding the influence of the condition sensor on the first relay.

2 Claims, 2 Drawing Figures

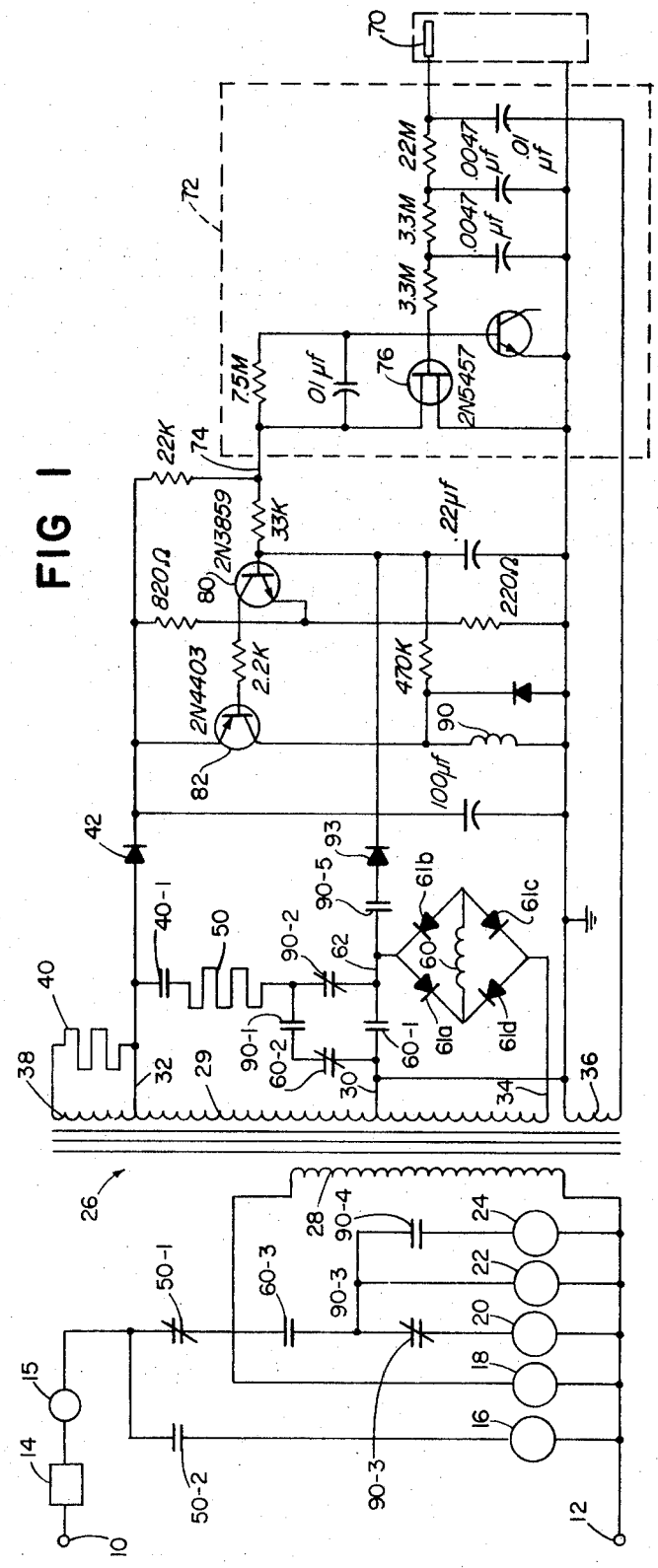

FLAME SENSOR CONTROL CIRCUIT

This invention relates to control apparatus. This application is a division of my copending application Ser. No. 15,014, filed Feb. 20, 1970 now U.S. Pat. No. 3,644,074.

The primary object of the invention is to control the operation of equipment. Another object is to provide for safe operation of a burner. A further object is to safely shut down a burner in the event of faulty operation of a flame detector.

The invention features a condition sensor, a first relay responsive to a signal from the condition sensor, the first relay being in a first state in the absence of a signal from the condition sensor and being switched to a second state in response to a signal from the condition sensor, a control relay adapted to be switched between first and second states, circuitry responsive to an operation request for switching the control relay from the first state to the second state after a time interval, and clamping circuitry operative in response to the detection of the first relay in its second state during the time interval to clamp the first relay in the second state and the control relay in the first state, overriding the influence of the condition sensor on the first relay.

Preferred embodiments feature control apparatus for a burner including: a flame rod detector feeding a signal into an electronic amplifier which in turn operates a flame relay adapted to assume, responsive to flame, one state when flame is absent and a second state when flame is present, and controlling switches adapted to actuate an ignition mode when the flame relay is in the first state and an operate mode when the flame relay is in the second state; a control relay effecting admission of fuel to the burner when in an energized state and withholding fuel when in a passive state; an operating control switch applying power to the control apparatus; a first timer connected to assume an active state when either of the following conditions occurs: (1) the flame relay is in one state, and the control relay is energized or (2) the flame relay is in the second state, and the fuel relay is passive, the first timer controlling circuits which lock out power to the control apparatus after the first timer persists in the active state for a predetermined interval; a second timer adapted to apply power to the first timer switch after a predetermined interval after power is applied to the apparatus; and clamping circuitry operating when the flame relay is in the second state and the control relay is in the passive state to clamp the flame and control relays in their second and passive states respectively, overriding the influence of the flame detector, the clamping circuit including a switch controlled by the flame relay which makes a connection to the amplifier from a terminal which is grounded by a control-relay-controlled switch when the control relay is energized.

Other objects, features, and advantages will appear from the following description of a preferred embodiment of the invention, taken together with the attached drawings thereof, in which:

FIG. 1 is a schematic diagram of the control apparatus, and

FIG. 2 is a diagram of the functional logic of the apparatus.

As shown in FIG. 1, the control apparatus has terminals 10 and 12 for connection to a suitable source of AC electrical power. An operating control 14 applies power to terminal 15. An alarm 16, a blower 18, an ignitor 20, a pilot valve controller 22 and a main fuel valve controller 24 and the primary winding 28 of transformer 26 are connected through various relay switches between terminal 15 and terminal 12. Secondary winding 29 of transformer 26 has a grounded center tap 30, a terminal 32 providing 17 volts and a terminal at the opposite end 34 providing 7 volts. A second secondary winding 36 provides 303 volts, and a third secondary winding 38 provides 0.2 volts. The apparatus includes also a safe-start heater 40 with associated switch 40-1 connected across secondary 38, and a lockout switch heater 50 and associated switches 50-1 (normally closed) and 50-2 (normally open). Control relay coil 60 is wired in a rectifying bridge circuit (consisting of rectifiers 61 a, b, c, d) between terminal 34 and terminal 62 and governs logic switches 60-1 (normally open), 60-2 (normally closed), and fuel control switch 60-3 (normally open). The system also includes a flame detector which in the preferred embodiment consists of a flame rod 70 connected to associated circuitry 72 including field effect transistor 76. The system further includes a two-stage amplifier with transistors 80 and 82 connected to flame relay coil 90 having associated switches 90-1 (normally open), 90-2 (normally closed), 90-3 (normally closed), 90-4 (normally open), and 90-5 (normally open).

In normal startup operation, operating control 14 is closed to apply power to terminal 15 and thence through normally closed switch 50-1 to blower 18 and transformer primary 28. Upon application of power to primary 28, power is immediately applied from secondary winding 29 through tap 32 and diode 42 to the electronic control circuits, from winding 38 to the safe-start heater, and from secondary winding 36 to the flame rod 70. In the absence of a flame, field effect transistor 76 is maintained in a conductive state effectively grounding terminal 74 so that a low voltage is applied to the base of transistor 80. Transistor 80 is therefore put in a non-conductive state which in turn raises the voltage of the base of transistor 82 putting transistor 82 in a non-conducting state and leaving relay coil 90 unenergized. After a short interval, typically a few seconds, safe-start heater 40 warms up and closes switch 40-1 thereby applying power to relay coil 60 through a circuit passing from terminal 32 of secondary winding 29 through switch 40-1, lockout heater 50, switch 90-2, terminal 62, relay coil 60, and to terminal 34 of secondary winding 29. Relay coil 60 is thereupon actuated and throws switches 60-1, 60-2, and 60-3 to their energized states. Switch 60-1 now connects terminal 62 to tap 30 of the transformer winding 29 thereby locking relay 60 in the on position independent of any changes occurring subsequently in switch 90-2; switch 60-2 opens a checkout circuit to be discussed hereafter; switch 60-3 closes to apply power to ignitor 20 and open pilot fuel control valve 22. As soon as ignition of the pilot is achieved, the flame is sensed by flame rod 70 which, acting through circuitry 72, places field effect transistor 76 in a non-conducting condition. The voltage at terminal 74 thereupon rises with the result that transistors 80 and 82 are switched on and relay coil 90 is energized to put switches 90-1, 90-2, 90-3, 90-4, 90-5, into their energized positions. Switch 90-2 opens and terminates flow of current through lockout heater 50. Switch 90-3 opens and terminates the operation of the ignitor. Switch 90-4 closes and actuates the main fuel valve to supply fuel for the burner. Switches 90-1 and 90-5 function in safety circuits to be described hereafter.

The control system is designed to provide safe operation in the face of a variety of malfunctions, and its action in the event of these malfunctions will now be described. First of all if the flame goes out during operation, flame rod 70 will cease sensing flame and cause field effect transistor 76 to pass over into its conducting state, with a consequent result that transistors 80 and 82 will become non-conductive and flame relay coil 90 will become de-energized. With the de-energizing of coil 90, the main fuel valve 24 will be turned off by the opening of switch 90-4 and the ignitor circuit will be actuated by switch 90-3 so that an effort is made to reignite the pilot flame. At the same time switch 90-2 closes connecting lockout heater 50 to power supplied from terminals 30 and 32 of transformer secondary 29. If reignition is successful, all control circuits resume their operating state in the manner described for the corresponding part of the startup operation. If, however, reignition is not achieved within some interval, typically ten seconds, lockout heater 50 becomes sufficiently hot to switch to the alarm state wherein it actuates alarm 16 by closing switch 50-2 and removes power from all other parts of the system by opening switch 50-1. Lockout switch 50 is designed to remain in the alarm condition until it is manually reset.

As a further provision for safe operation, the system automatically checks the proper functioning of the flame detector during startup. Immediately upon closure of the operating control 14, power is applied to the flame rod and to the electronic circuitry. At this time no flame is present, and if the flame rod is working properly, the absence of flame results in field effect transistor 76 being in a conductive state with transistors 80 and 82 in a non-conducting state and relay coil 90 de-energized. If at any time, however, during the check period between closure of the operating control 14 and the closure of safe-start switch 40-1 a malfunction of the flame rod results in a spurious indication of flame, transistor 80 and 82 will be switched to their conducting state and relay coil 90 will be energized. If coil 90 is so energized, switch 90-5 will be closed and a positive potential will be applied to the base of transistor 80 through a circuit running from terminal 34 of the transformer secondary through coil 60, switch 90-5 and diode 93, with the result that transistors 80 and 82 will be clamped in their conductive states and coil 90 locked in its energized condition. This condition will persist without regard to subsequent changes in the flame rod 70 or the field effect transistor 76. The clamping current passing to the base of transistor 80 is, however, too small to energize coil 60, which remains in its de-energized state. The result of the action of the clamping circuit is thus to clamp coil 90 in its energized state if there is even a momentary spurious indication of flame. At the same time switch 90-1 closes and switch 90-2 opens. At the end of the check period the safe-start switch 40-1 closes applying power to the top of the lockout switch heater 50. Because switch 90-2 is now open (still supposing a malfunction as described), power is not applied from the lockout heater to terminal 62, and relay coil 60 is not energized. Switch 60-3 is therefore not closed, and the ignition sequence is not initiated. The lockout heater 50 is, however, energized through switch 90-1 (now closed) and switch 60-2 and will after a short delay operate to open switch 50-1 and close switch 50-2 thereby actuating the alarm and otherwise shutting down the whole system as previously described when there was a flame failure. Thus even a momentary malfunction of the flame rod (as from an intermittent short circuit) during the check period will result in a safe abort of the start sequence and the actuation of the alarm.

The circuit from terminal 62 through switch 90-5 and diode 93 to the base of transistor 80 has no effect after relay coil 60 has been energized and switch 60-1 has closed, since under these circumstances terminal 62 is at a lower potential than the base of transistor 80 and current flow is blocked by diode 93 irrespective of the condition of switch 90-5.

The functional logic of the system is summarized in FIG. 2. The lockout heater 50 is activated when the system is in either IGNITE or the SPURIOUS FLAME mode so that when the system persists in either of these modes it leads to shutdown. In normal startup the system passes from OFF to IGNITE to OPERATE. A flame failure returns the system from OPERATE to the IGNITE mode. The system logic precludes transfer directly from OFF to OPERATE modes. If the system is, due to some malfunctions, put in the SPURIOUS FLAME mode (ostensibly in which a flame is detected but no fuel is on) even momentarily, clamping circuits, overriding any subsequent changes in the flame detector, hold the system in the SPURIOUS FLAME mode until shutdown occurs through the action of lockout heater 50.

While a particular embodiment of the invention has been shown and described, various modifications will be obvious to those skilled in the art. For example, it will be obvious that principles of the invention are applicable to circuitry using other types of flame detectors, such as ultraviolet radiation sensors. Also, other forms of timers and clamping circuitry may be employed in the practice of various aspects of the invention. Therefore, it is not intended that the invention be limited to the disclosed embodiment or to details thereof but departures may be made therefrom within the spirit and scope of the invention.

What is claimed is:

1. Control apparatus for a burner comprising a flame sensor, a first relay responsive to a signal from said flame sensor, said first relay being in a first state in the absence of a signal from said flame sensor and being switched to a second state in response to a signal from said flame sensor, a control relay adapted to be switched between first and second states, time interval providing circuitry responsive to an operation request for switching said control relay from said first state to said second state after a time interval, and clamping circuitry responsive to the detection of said first relay in its second state during said time interval to clamp said first relay in said second state and said control relay in said first state, overriding the influence of said flame sensor on said first relay.

2. The control apparatus of claim 1 wherein said control relay includes an operating coil connected in series with a normally open contact of said control relay across a power source, and further including a normally open contact controlled by said first relay connected in series between said control relay coil and the input to said first relay.

* * * * *